United States Patent [19]
Schmitt

[11] Patent Number: 5,809,107
[45] Date of Patent: Sep. 15, 1998

[54] CATAPULT GRID DRAWER WITH MEANS FOR PREVENTING INCORRECT INSERTION OF ANTI-SCATTER GRID INTO DRAWER RECEPTACLE

[75] Inventor: Thomas Schmitt, Forchheim, Germany

[73] Assignee: Siemens Aktiengesellschaft, Munich., Germany

[21] Appl. No.: 915,616

[22] Filed: Aug. 21, 1997

[30] Foreign Application Priority Data

Aug. 21, 1996 [DE] Germany .................. 196 34 066.7

[51] Int. Cl.$^6$ ................................................. A61B 6/00
[52] U.S. Cl. ................................. 378/154; 378/186
[58] Field of Search .................... 378/154, 155, 378/167, 177, 186

[56] References Cited

U.S. PATENT DOCUMENTS

| | | | |
|---|---|---|---|
| H1201 | 6/1993 | Sakuma .......................... | 378/185 X |
| 4,132,897 | 1/1979 | Ohlson et al. . | |
| 4,300,053 | 11/1981 | Guynes . | |
| 4,310,766 | 1/1982 | Finkenzeller et al. . | |
| 4,457,010 | 6/1984 | Jenkins et al. . | |
| 4,706,269 | 11/1987 | Reina et al. .......................... | 378/154 |
| 5,241,578 | 8/1993 | MacMahon .......................... | 378/154 |

FOREIGN PATENT DOCUMENTS

| | | |
|---|---|---|
| 2838901 | 3/1980 | Germany . |
| 557121 | 11/1943 | United Kingdom . |

*Primary Examiner*—David P. Porta
*Attorney, Agent, or Firm*—Sughrue, Mion, Zinn, Macpeak & Seas, PLLC

[57] ABSTRACT

A receptacle (3, 13) for an anti-scatter grid (4) and the anti-scatter grid (4) of a catapult grid drawer (1) are constructed such that the anti-scatter grid (4) is held in the receptacle (3, 13) only in a predetermined orientation. In accordance with one variant, guides (5, 6) of the receptacle (3) cooperate with edges (7, 8, 9, 10, 11, 12) of the anti-scatter grid (4) so that together they form a key and slot connection. In accordance with a further variant of the invention, e.g. the anti-scatter grid (4) is provided with a machine-readable code (14). A reader (15) for the code (14) as well as a lock (19) controlled by a signal from the reader (15) are provided in the region of the receptacle (13). The lock (19) releases the access to the receptacle (13) only if the predetermined orientation between the grid (4) and the receptacle (13) exists.

7 Claims, 2 Drawing Sheets

CATAPULT GRID DRAWER WITH MEANS FOR PREVENTING INCORRECT INSERTION OF ANTI-SCATTER GRID INTO DRAWER RECEPTACLE

The following disclosure is based on German Patent Application No. 19634066.7, filed on Aug. 21, 1996, which is incorporated into this application by reference.

FIELD OF AND BACKGROUND OF THE INVENTION

The invention relates to new and useful improvements in a catapult grid drawer used, e.g., in X-ray diagnostic devices. More particularly, the invention relates to a catapult grid drawer capable of preventing an anti-scatter grid from being incorrectly inserted into a receptacle of the catapult grid drawer.

German Laid-Open Publication DE 29 38 901 C2 and related U.S. Pat. No. 4,310,766 disclose a catapult grid drawer for an anti-scatter grid. The anti-scatter grid includes guide parts on two of its sides situated opposite one another, by means of which the anti-scatter grid is guided adjustably into a receptacle in the catapult grid drawer. Specifically, a first guide part provided on one edge of the anti-scatter grid has two sliding lugs which engage a U-shaped rail of a frame of the catapult grid drawer. The other guide part on the oppositely situated edge is provided with two bores. These two bores are engaged by corresponding pins of a support mounting part connected to a motor drive in the catapult grid drawer. The first guide part and the U-shaped rail cooperate in the form of a key and slot connection.

The lamellae, or blades, of the anti-scatter grid are arranged to be aligned with the focus of the X-ray device. Thus, a specific anti-scatter grid should be matched to a prescribed film/grid-focus distance. In other words, the anti-scatter grid must be exchanged whenever there is a change in the film-focus distance. However, when the anti-scatter grid is exchanged for another, it can happen that the new grid is inserted incorrectly into the receptacle in the catapult grid drawer, such that the lamellae are no longer aligned with the focus, but rather are directed away from the focus. This is disadvantageous for image formation, because, as a result, sufficient radiation no longer impinges on the film, or, if a phototimer is used, the radiation dose, and thus the radiation burden of the object under investigation, is increased.

OBJECTS OF THE INVENTION

It is therefore a primary object of the invention to design a catapult grid drawer of the type described above so as to ensure that the lamellae of the anti-scatter grid are always aligned with the focus of the X-ray transmitter.

SUMMARY OF THE INVENTION

The catapult grid drawer according to the invention includes an anti-scatter grid for absorbing stray X-ray radiation and a receptacle in the drawer for the anti-scatter grid. Means for mounting the anti-scatter grid in said receptacle only in one predetermined relative orientation are provided, which prevent the anti-scatter grid from being inserted into the drawer in any orientation other than the one in which the lamellae are properly aligned with the focus of the X-ray transmitter.

According to one aspect of the invention, a first edge of the anti-scatter grid and a first guide of the receptacle differ from a second edge of the anti-scatter grid and a second guide of the receptacle in such a way that it is possible to slide the anti-scatter grid into the receptacle only if the coordination is correct.

It is particularly advantageous if the edges and the guides cooperate in the form of a key and slot connection, such that each key and slot pair differ from other pairs in regard to thickness, width, shape and/or with regard to where they are arranged in the receptacle.

According to another aspect of the invention, a controllable lock is provided, which is released only if the predetermined coordination between the grid and the receptacle exists.

BRIEF DESCRIPTION OF THE DRAWINGS

Further advantages and details of the invention emerge from the following description of preferred embodiments thereof, taken in conjunction with the drawings, in which.

DETAILED DESCRIPTION OF THE PREFERRED EMBODIMENTS

Figure 1:
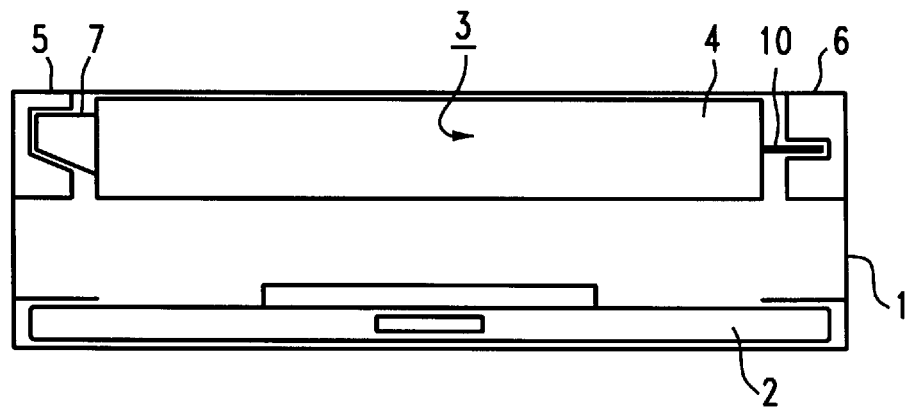
FIG. 1 shows a catapult grid drawer according to a first embodiment of the invention.

A catapult grid drawer is denoted in FIG. 1 by the reference numeral 1. This catapult grid drawer 1 can be arranged on a patient positioning table or on a Bucky wall stand, and holds, e.g., a film cassette, a matrix detector or other detector device in a cutout 2. Arranged above this cutout 2, i.e., in the direction towards the ray transmitter (not shown), is an anti-scatter grid 4 whose lamellae are aligned with the focus of the ray transmitter. The anti-scatter grid 4 is held by a receptacle 3, which has guides 5, 6 situated opposite one another. A first edge 7 of the anti-scatter grid 4 is constructed such that it can be held exclusively by the first matched guide 5. Likewise, the second edge 10 is constructed such that it mates uniquely and can be held exclusively by the second guide 6. The first and second edges 7, 10 and the associated guides 5,6 each preferably cooperate to form a "key and slot" connection, and permit adjustment of the anti-scatter grid 4 along the guides 5, 6.

Figure 2:
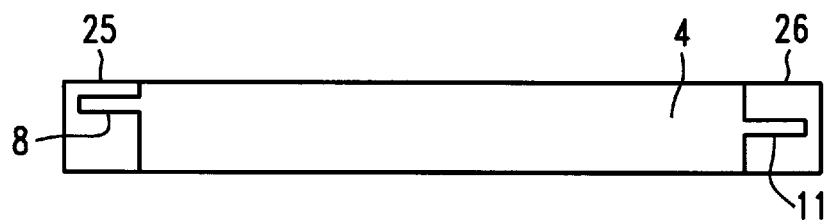
FIGS. 2 and 3 show further exemplary embodiments of the inventive catapult grid drawer.
Figure 3:
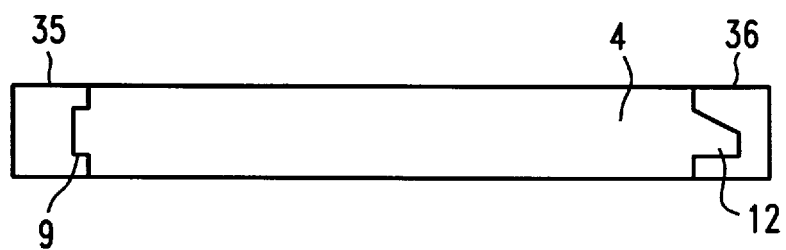

FIGS. 2–3 show arrangements analogous to that of FIG. 1. As in the case of FIG. 1, the first edges 8 and 9 cooperate to form a "key and slot" connection with the first guides 25 and 35, respectively. The second edges 11 and 12 cooperate similarly with the second guides 26 and 36, respectively. Again as in the case of FIG. 1, however, the first edges 8 and 9 are uniquely configured to mate only with the first guides 25 and 35, respectively. Preferably, the converse also holds true, i.e., the second edges 11 and 12 mate with the second guides 26 and 36, respectively, but not with the first guides 25 and 35.

FIGS. 1–3 differ from one another predominantly in the configuration of the means used to mount the anti-scatter grid 4 in the receptacle 3. In the embodiment according to FIG. 1, the edges 7, 10 (keys) differ from one another in particular with regard to thickness. In the embodiment according to FIG. 2, the edges 8, 11 differ from each other with regard to their positioning within the receptacle. In the embodiment in accordance with FIG. 3, the edges 9 and 12 are different in their shape and/or width.

Each of the embodiments of FIGS. 1–3 ensure that the anti-scatter grid 4 can be inserted into the guides 5, 6 only in one predetermined alignment, in which the lamellae of the anti-scatter grid 4 are aligned with the focus of the ray transmitter. Another variant which also achieves this desired result and which is also within the scope of the invention is one in which the "keys" are provided on the receptacle 3, and the "slots" are formed in the anti-scattering grid 4.

Figure 4:
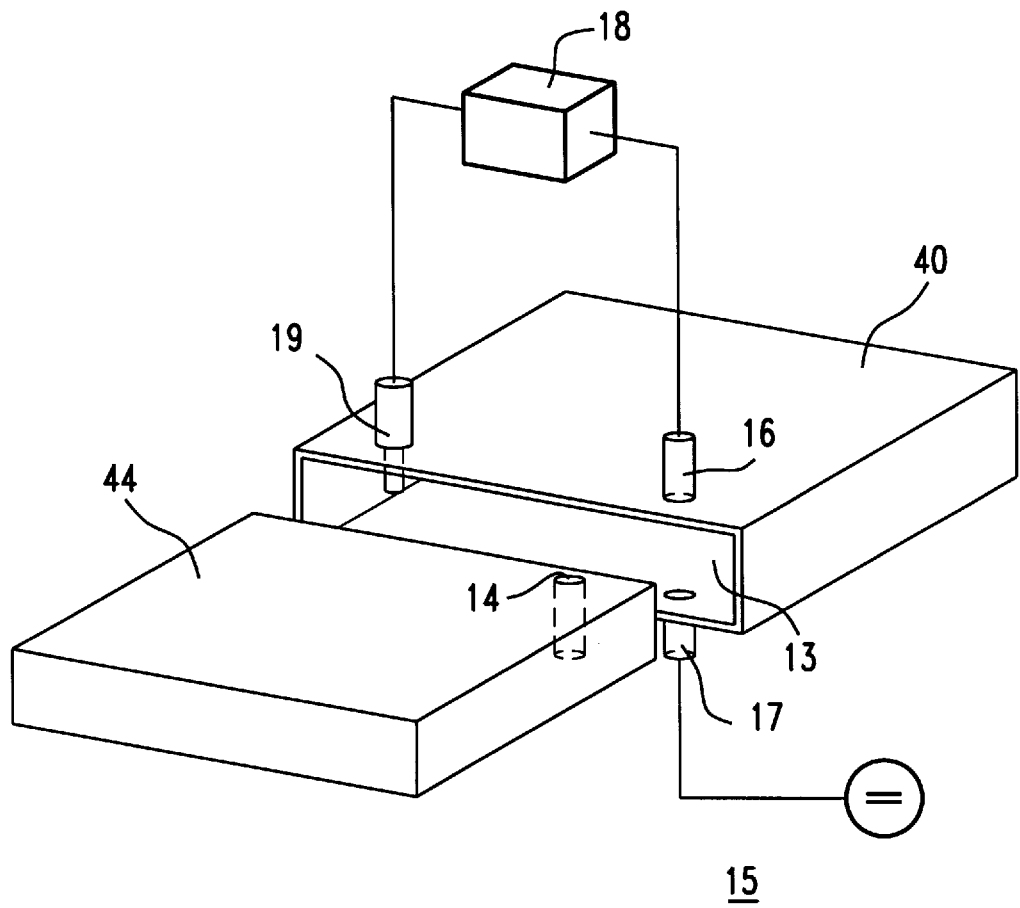
FIG. 4 shows a further embodiment of a catapult grid drawer according to the invention.

In the embodiment of the invention according to FIG. 4, a receptacle for the anti-scatter grid 44 is denoted by reference numeral 13. The anti-scatter grid 44 preferably has a machine-readable code provided in its edge region. This code can be, e.g., a cutout 14 which is coordinated with a reader 15 fashioned, e.g., as a light barrier on the catapult grid drawer 40. If the light receiver 16 receives the light from the light transmitter 17, it generates a signal, which is detected by a downstream controller 18. Upon detecting the signal, this controller 18, in turn, retracts a lock 19, which otherwise projects at least partly into the cutout 13, thereby freeing access to the receptacle 13 for the anti-scatter grid 44. As with the embodiments of FIGS. 1–3, this embodiment also achieves the desired result of preventing insertion of the anti-scatter grid 44 for all orientations of the grid except the correct one. As such, the anti-scatter grid 44 can be mounted in the receptacle 13 only if the relative orientation is correct. This, in turn, ensures that the lamellae are always correctly aligned with the focus of the ray transmitter.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A catapult grid drawer comprising:
   an anti-scatter grid; and
   a receptacle for said anti-scatter grid;
      wherein said anti-scatter grid and said receptacle comprise means for mounting said anti-scatter grid in said receptacle only in one predetermined relative orientation.

2. The catapult grid drawer as claimed in claim 1, wherein:
   said receptacle comprises at least a first guide and a second guide situated opposite said first guide within said receptacle;
   said anti-scatter grid comprises at least a first edge and a second edge situated opposite said first edge on said anti-scatter grid;
   said first guide and said first edge form a first key and slot interconnection;
   said second guide and said second edge form a second key and slot interconnection; and
   said first key and slot interconnection differs from said second key and slot interconnection in at least one physical characteristic such that said anti-scatter grid is insertable into said receptacle only in the one predetermined relative orientation.

3. The catapult grid drawer as claimed in claim 2, wherein said first key and slot interconnection differs from said second key and slot interconnection at least in dimension.

4. The catapult grid drawer as claimed in claim 3, wherein said first key and slot interconnection differs from said second key and slot interconnection at least in one of thickness, width or shape.

5. The catapult grid drawer as claimed in claim 2, wherein said first key and slot interconnection differs from said second key and slot interconnection at least in distance from a point of symmetry of said anti-scatter grid.

6. The catapult grid drawer as claimed in claim 1, wherein:
   said anti-scatter grid comprises a machine-readable coding; and
   said receptacle comprises:
      a reader for reading the coding; and
      a lock controlled by the reader in accordance with the reading of the coding; and wherein:
   the reading of the coding is indicative of the relative orientation of said anti-scatter grid and said receptacle; and
   said lock releases to permit insertion of said anti-scatter grid into said receptacle only if said reader successfully reads the coding.

7. The catapult grid drawer as claimed in claim 6, wherein:
   the machine-readable coding comprises at least one cutout non-symmetrically positioned in said anti-scatter grid;
   said reader comprises a light barrier comprising a light transmitter and a light receiver; and
   said light transmitter and light receiver overlap with the cutout when said anti-scatter grid is inserted at least partially into said receptacle in the one predetermined relative orientation.

\* \* \* \* \*